Dec. 29, 1953  R. E. HALL  2,664,524
AUTOMATIC LIGHTING CIRCUIT
Filed Sept. 26, 1952
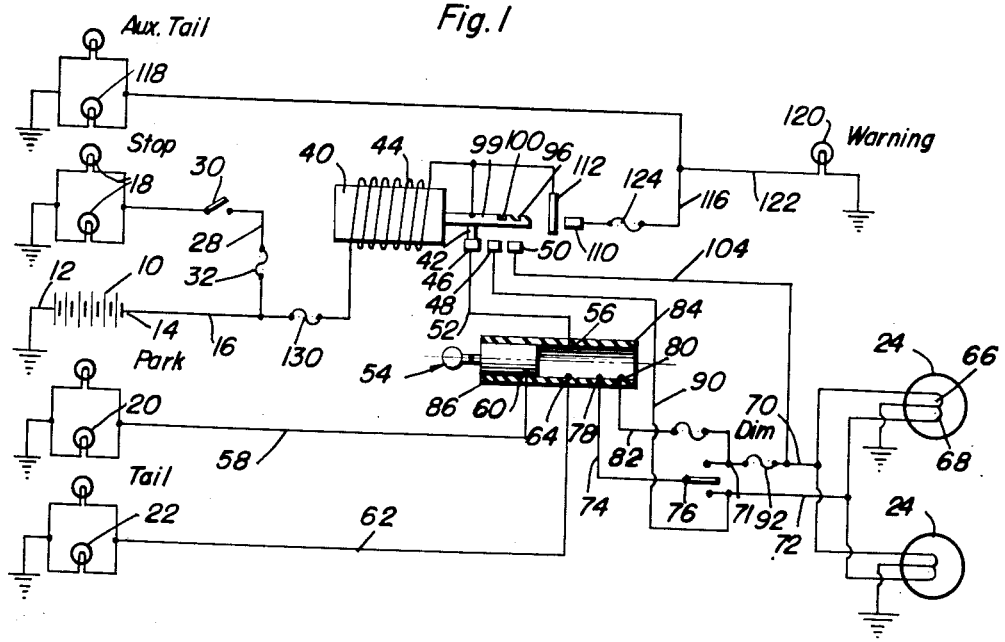
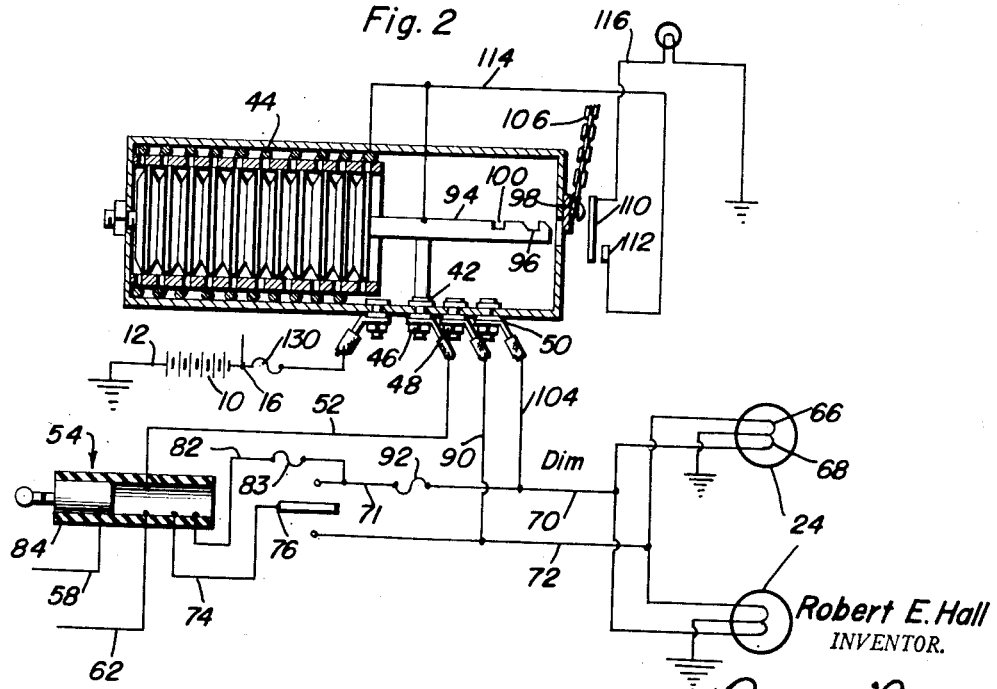
Robert E. Hall
INVENTOR.

Patented Dec. 29, 1953

2,664,524

UNITED STATES PATENT OFFICE 2,664,524

AUTOMATIC LIGHTING CIRCUIT

Robert E. Hall, Larkinsville, Ala.

Application September 26, 1952, Serial No. 311,738

11 Claims. (Cl. 315—83)

This invention relates to an automatic lighting circuit and particularly to a safety circuit to be used in an automotive vehicle to maintain lights as long as it is possible to maintain any light anywhere in the system.

In the operation of lighting systems in automotive vehicles and in other vehicles, difficulty has been maintained because a ground in the system frequently causes the fuses to blow leaving the vehicle without lights. The present invention provides a lighting system having automatic overload responsive devices for changing the lighting connections to the various lighting parts and in the event of a continued overload, will give a signal of such overload and maintain certain signal lights independent of others so that if it is possible to maintain lights in any part of the system, such lights will be maintained.

This is accomplished by means of a thermostatic device having a movable contact and a plurality of fixed contacts with a heating element in series with the lighting circuit and associated with the thermostat so that normal current to the lighting system will maintain the thermostat in non-activated condition so that a control switch may be utilized to connect the source of lighting energy to the various components as may be desired. The second and third contacts of the thermostatic system are directly connected to the high and low beams of the headlight system and through the headlight system to various auxiliary lights such as a taillight so that in the event of an overload, an attempt will be made first to operate the high lights and then in the event the overload is maintained, an attempt will be made to operate the low lights and to isolate the low lights from the remaining of the system and to utilize an auxiliary tail-light connected directly to the source and independent of the rest of the lighting system. Also, a warning light may be utilized to indicate that the auxiliary tail-light has been energized indicating that the system has reached its final effort in maintaining light.

It is accordingly an object of the invention to provide an automatic lighting system for a vehicle.

It is a further object of the invention to provide a lighting system which will normally be manually controlled but in the event of trouble will automatically test the various sections to attempt to maintain light therein.

It is a further object of the invention to provide a means of isolating the portions of the system from each other so that faults in one portion of the system will not prevent operation of the remainder of the system.

It is a further object of the invention to provide an automatic selector which after having automatically operated will remain operative.

It is a further object of the invention to provide an automatic selector which will indicate a final act in the automatic selection.

Other objects and many of the attendant advantages of the present invention will be apparent from the following detailed description taken in conjunction with the accompanying drawing, in which:

Figure 1 is a schematic illustration of an automatic light control system according to the invention; and, Figure 2 is a fragmentary schematic illustration showing the automatic control device according to the invention.

In the exemplary embodiment of the invention, a vehicle control system has a source of control or electrical potential herein indicated as a battery 10, one terminal 12 of which is mounted on the frame of the vehicle and the other terminal 14 is provided with a conductor 16 for supplying current to the various lighting sources such as the stoplights 18, parking lights 20, taillights 22 and dual beam headlights 24. The stoplights 18 are connected to the main conductor 16 by means of a branch conductor 26 containing the usual brake controlled switch 30 and having an independent current responsive device herein indicated as a fuse 32, although it could well be any of the over-current switching devices now in use.

The lighting system combines a thermostat 40 having a movable contact 42 and a heating coil 44. The conductor 16 is connected to the movable contact 42 with the heating coil 44 connected in series circuit relation therewith. The movable contact 42 makes contact with the first, second and third control contacts 46, 48 and 50. During normal current conditions or no current to the lighting system, the movable contact 42 will be in contact with the fixed contact 46 to which a conductor 52 is connected for normal connection to the lighting circuit by means of a switch 54 which has a terminal 56 connected to the conductor 52 or the fixed contact 46. The parking lights 20 are connected by means of a conductor 58 to the terminal 60 in the switch 54. The taillights 22 are likewise connected by a conductor 62 to a terminal 64 in the switch 54.

The twin beam headlights 24 are provided with a pair of filaments or beam projectors 66 and 68 and for purposes of convenience the beam 66 will be indicated as a low or dim beam and the beam 68 will be indicated as a bright or high beam. Obviously, the beams 66 and 68 may be either of different intensity or pointed in different directions or both. The low beams 66 are provided with a conductor 70 and the high beams 68 are provided with a supply conductor 72. The headlight conductor 74 is connected to the midpoint of a selector switch 76 and is provided with a terminal 78 in the switch 54. An auxiliary terminal 80 in the switch 54 is connected to a conductor 82 which is directly connected to an intermediate portion 71 of the low beam conductor 70.

Terminals 56, 60, 64, 78 and 80 are preferably provided in an insulating housing 84 in which is mounted a bridging conductor 86 which may be operated by any suitable means such as sliding in the housing 84 or by turning therein or any combination thereof. Terminal 56 and the size of the bridging member 86 is such that a plurality of various connections may be made. The bridging connector may be extended between the terminal 56 and the terminal 60 so that only the parking lights are energized. Likewise the bridging member 86 may be so supplied or arranged that the terminal 56 will be connected to the parking lights and to the tail-lights so that both the parking lights and the tail-light will be energized. Upon further movement of the bridging member 86, the terminal 56 will be connected to the tail-light and to the headlight conductor 74 so that the tail-light and the headlights will be illuminated and the parking lights will be extinguished. In this position the manual control may be exercised and either the low or high beams may be selected at will by operation of the selector switch 76. By further operation of the bridging member 86 the terminals 56 may be connected to the terminals 64, 78 and 80 so that the tail-lights will be energized and the low beams will be energized and if the switch selector 76 is connected to the high beams, both the high and low beams will be energized.

In the event the lighting system should draw excessive current through the heating coil 44, it will cause movement of the thermostat to move the movable contact 42 out of engagement with the contact 46 into engagement with the second fixed contact 48 so that the high beam conductor 72 will be directly energized from the source by means of the secondary conductor 90. With the switch 54 in fully closed position and the selector switch 76 in contact with the conductor 72, the tail lamp 22 will be energized from the high beam conductor 72 by means of the bridging member 86 bridging the terminals 78 and 64. The low beam conductor 70 would also be energized over conductor 82 which includes a low capacity fuse 83. If there should be a short or other disturbance in the low beam circuit, the protective fuse 83 which is herein shown as the usual fusible element, although any automatically opening device can be utilized, would open the low beam circuit and terminate the overload so that the high beam circuit would be maintained energized because of the contact with the movable contact 42 and fixed contact 48. The thermostat 40 is provided with a lock arm 94 having a first locking notch 96 corresponding to the contact 48 and a second notch 100 corresponding to the contact 50. A latch 98 is provided for engagement with the locking notches 96 and 100.

In the event the fault is in the high beam circuit, the excessive current drawn through the heating coil 44 will cause the contact 42 to move into engagement with the contact 50 so that the latch 98 will fall into the latch groove 100 and lock the contacts 42 and 50 in series with the conductor 104 which is connected to the low beam conductor 70 and if the fault is in the high beam line, the safety device 92 will be opened so that the low beam will be continuously lighted. If the latch member is in the locking groove 96 or 100, the decrease in temperature in the heating coil 44 will not cause reverse motion of the movable contact 42 until such time as the latch bar is lifted by any suitable means such as the lifting chain 106.

The expansion of the thermostat to drive the locking bar 94 so that the latch 98 engages the latching notch 96 or 100 extends the bar into contact with the movable element 110 of an auxiliary switch which closes its contact 112 to which is connected an auxiliary conductor 114 and the closing of the contact 110 and 112 energizes the auxiliary circuit 116. The auxiliary circuit 116 is preferably directly connected to an auxiliary light 118 so that the operation of the thermostatic device by moving to the fixed contact 48 or 50 which has eliminated the tail light 22 will establish an auxiliary tail light 118 so that the tail light will be maintained regardless of the condition of the lighting circuit. It will frequently be desirable to supply a warning signal 120 herein indicated as a lamp which may be conveniently mounted on the dash or other portion of the vehicle and supplied by an auxiliary line 122 connected into the auxiliary line 116. An over-current safety device 124 may be provided in the auxiliary circuit 116 so that any danger of short in the auxiliary system will separate itself from the main supply circuit 16.

In the operation of this system under normal operating conditions, the movable contact 42 and the fixed contact 46 will remain in contact so that the lighting system is under the control of the switch 54 which may be utilized to select any desired combination of the lighting fixtures of the system. In the event of a short or other reason for producing over-current in the system, the thermostatic device will disconnect the supply circuit 16 from the normal manual control switch and first attempt to supply the high beam with normal current while the tail light of the vehicle is connected through the manual control switch. If the difficulty persists, the thermostatic device will again operate to connect the supply circuit 16 into the low beam circuit 70 after which the over-current device 92 will separate the low beam device from the rest of the system so that only the low beam of the headlights will be energized and simultaneously the thermostatic device will have closed an auxiliary switch to establish connections to an auxiliary tail light so that regardless of the condition of the regular tail light or the high beam circuit, headlights and tail lights will be maintained on the vehicle. In the event of excessive damage to the vehicle or the lighting system thereof, it might be desirable to provide an over-current protective device such as the fuse 130 in the main supply line to the lighting system. However, it should be noted that the device 130 should have sufficient capacity to simultaneously destroy or open the protective devices 92 and 124 or, in other words, it could be a slow acting device so that excessive current could flow for a short interval of time but the circuit would be open before danger of a fire would exist.

It will thus be seen that the present device will maintain lights on a vehicle if any lights can be maintained and that the device will successively try until the lights have all been found to be inoperative or until lights are maintained.

While for purposes of illustration a particular embodiment of the invention has been shown, and described according to the best present understanding thereof, it will be apparent to those skilled in the art that many changes and modifications can be made therein without departing from the true spirit of the invention.

Having thus described the invention, what is claimed as new is:

1. In a vehicle lighting system having tail lights, parking lights, stoplights and dual beam headlights, a source of electric energy and circuit means for connecting said lights to said source, an automatic protective device comprising a thermostat, a heating coil for said thermostat, a movable contact on said thermostat, a plurality of fixed contacts on said thermostat, said heating coil being connected between said source and said movable contact, said heating coil being operative under normal current to said lighting system to maintain said movable contact in engagement with the first of said fixed contacts and operative on over-current to successively move said movable contact into engagement with said fixed contacts, a control switch connected in series with said first contact.

2. In a vehicle lighting system having tail lights, parking lights, stoplights and dual beam headlights, a source of electric energy and circuit means for connecting said lights to said source, an automatic protective device comprising a thermostat, a heating coil for said thermostat, a movable contact on said thermostat, a plurality of fixed contacts on said thermostat, said heating coil being connected between said source and said movable contact, said heating coil being operative under normal current to said lighting system to maintain said movable contact in engagement with the first of said fixed contacts and operative on over-current to successively move said movable contact into engagement with said fixed contacts, a control switch connected in series with said first contact, an auxiliary circuit, a switch in said auxiliary circuit, said switch being operable by full movement of said thermostat.

3. In a vehicle lighting system having tail lights, parking lights, stoplights and dual beam headlights, a source of electric energy and circuit means for connecting said lights to said source, an automatic protective device comprising a thermostat, a heating coil for said thermostat, a movable contact on said thermostat, a plurality of fixed contacts on said thermostat, said heating coil being connected between said source and said movable contact, said heating coil being operative under normal current to said lighting system to maintain said movable contact in engagement with the first of said fixed contacts and operative on over-current to successively move said movable contact into engagement with said fixed contacts, a control switch connected in series with said first contact, said control switch being operative to selectively energize the lights of said system.

4. In a vehicle lighting system having tail lights, parking lights, stoplights and dual beam headlights, a source of electric energy and circuit means for connecting said lights to said source, an automatic protective device comprising a thermostat, a heating coil for said thermostat, a movable contact on said thermostat, a plurality of fixed contacts on said thermostat, said heating coil being connected between said source and said movable contact, said heating coil being operative under normal current to said lighting system to maintain said movable contact in engagement with the first of said fixed contacts and operative on over-current to successively move said movable contact into engagement with said fixed contacts, a control switch connected in series with said first contact, latch means for maintaining said contacts in maximum moved position.

5. In a vehicle lighting system having tail lights, parking lights, stoplights and dual beam headlights, a source of electric energy and circuit means for connecting said lights to said source, an automatic protective device comprising a thermostat, a heating coil for said thermostat, a movable contact on said thermostat, a plurality of fixed contacts on said thermostat, said heating coil being connected between said source and said movable contact, said heating coil being operative under normal current to said lighting system to maintain said movable contact in engagement with the first of said fixed contacts and operative on over-current to successively move said movable contact into engagement with said fixed contacts, a control switch connected in series with said first contact, said lighting system including separate conductors for energizing the individual beams of said dual beam lights, a selector switch in series with said control switch for selectively energizing said dual beams through said control switch, said control switch being operative to energize one of said dual beams independent of said selector switch.

6. In a vehicle lighting system having tail lights, parking lights, stoplights and dual beam headlights, a source of electric energy and circuit means for connecting said lights to said source, an automatic protective device comprising a thermostat, a heating coil for said thermostat, a movable contact on said thermostat, a plurality of fixed contacts on said thermostat, said heating coil being connected between said source and said movable contact, said heating coil being operative under normal current to said lighting system to maintain said movable contact in engagement with the first of said fixed contacts and operative on over-current to successively move said movable contact into engagement with said fixed contacts, a control switch connected in series with said first contact, said lighting system including separate conductors for energizing the individual beams of said dual beam lights, a selector switch in series with said control switch for selectively energizing said dual beams through said control switch, said control switch being operative to energize one of said dual beams independent of said selector switch, said movable contact being operable in response to over-current to said lighting system to successively energize said dual beams independently of said control switch and said selector switch.

7. In a vehicle lighting system having tail lights, parking lights, stoplights and dual beam headlights, a source of electric energy and circuit means for connecting said lights to said source, an automatic protective device comprising a thermostat, a heating coil for said thermostat, a movable contact on said thermostat, a plurality of fixed contacts on said thermostat, said heating coil being connected between said source and said movable contact, said heating coil being operative under normal current to said lighting system to maintain said movable contact in engagement with the first of said fixed contacts and operative on over-current to successively move said movable contact into engagement with said fixed contacts, a control switch connected in series with said first contact, an auxiliary circuit, a switch in said auxiliary circuit, said switch being operable by full movement of said thermostat, an auxiliary tail light, said auxiliary tail light being controlled by said auxiliary switch.

8. In a vehicle having multiple beam headlights, tail lights and parking lights, an automatic control system comprising a thermostatic device, a heating coil for said device, a plurality of contacts on said device, said contacts being successively engaged upon predetermined heating of said device, a supply circuit from said source to said lights, said circuit including in series circuit relation said heating coil and one of said contacts, a control switch connected in series with the first of said successively engaged contacts, said control switch being operable to selectively energize the various lights either singly or in combination.

9. In a vehicle lighting system having tail lights, parking lights, stoplights and dual beam headlights, a source of electric energy and circuit means for connecting said lights to said source, an automatic protective device comprising a thermostat, a heating coil for said thermostat, a movable contact on said thermostat, a plurality of fixed contacts on said thermostat, said heating coil being connected between said source and said movable contact, said heating coil being operative under normal current to said lighting system to maintain said movable contact in engagement with the first of said fixed contacts and operative on over-current to successively move said movable contact into engagement with said fixed contacts, a control switch connected in series with said first contact, an auxiliary circuit, a switch in said auxiliary circuit, said switch being operable by full movement of said thermostat, an auxiliary tail light, said auxiliary tail light being controlled by said auxiliary switch, an auxiliary dash light controlled by said auxiliary switch.

10. In a vehicle lighting system having a tail light, parking lights and dual beam headlights supplied from an electrical energy source in the vehicle, a safety system comprising a thermostat, a heating coil for said thermostat, a movable contact carried by said thermostat, said heating coil being connected between said source and said moving coil, a first, second and third fixed contact, said movable contact being normally engaged with said first fixed contact, said thermostat being operable in response to excessive current to said system to successively engage said movable contact with said fixed contacts, latch means operable to retain said movable contact in maximum moved position, a control switch connected in series with said first fixed contact, said second and third fixed contacts being directly connected to the respective dual beams.

11. In a vehicle lighting system having a tail light, parking lights and dual beam headlights supplied from an electrical energy source in the vehicle, a safety system comprising a thermostat, a heating coil for said thermostat, a movable contact carried by said thermostat, said heating coil being connected between said source and said moving coil, a first, second and third fixed contact, said movable contact being normally engaged with said first fixed contact, said thermostat being operable in response to excessive current to said system to successively engage said movable contact with said fixed contacts, latch means operable to retain said movable contact in maximum moved position, a control switch connected in series with said first fixed contact, said second and third fixed contacts being directly connected to the responsive dual beams, said control switch including terminals connected respectively to said parking light, said tail light, a selector switch, one of said dual beams and said first fixed contact, a bridge member connecting said fixed contact selectively to said parking light, said parking light and said tail light, said tail light and said selector switch, and said tail light, said selector switch and said one of said dual beams.

ROBERT E. HALL.

References Cited in the file of this patent

UNITED STATES PATENTS

| Number | Name | Date |
| --- | --- | --- |
| 2,014,592 | Schwarze | Sept. 17, 1935 |
| 2,059,780 | Edwards et al. | Nov. 3, 1936 |
| 2,309,039 | Blumle et al. | Jan. 19, 1943 |